Patented Sept. 19, 1939

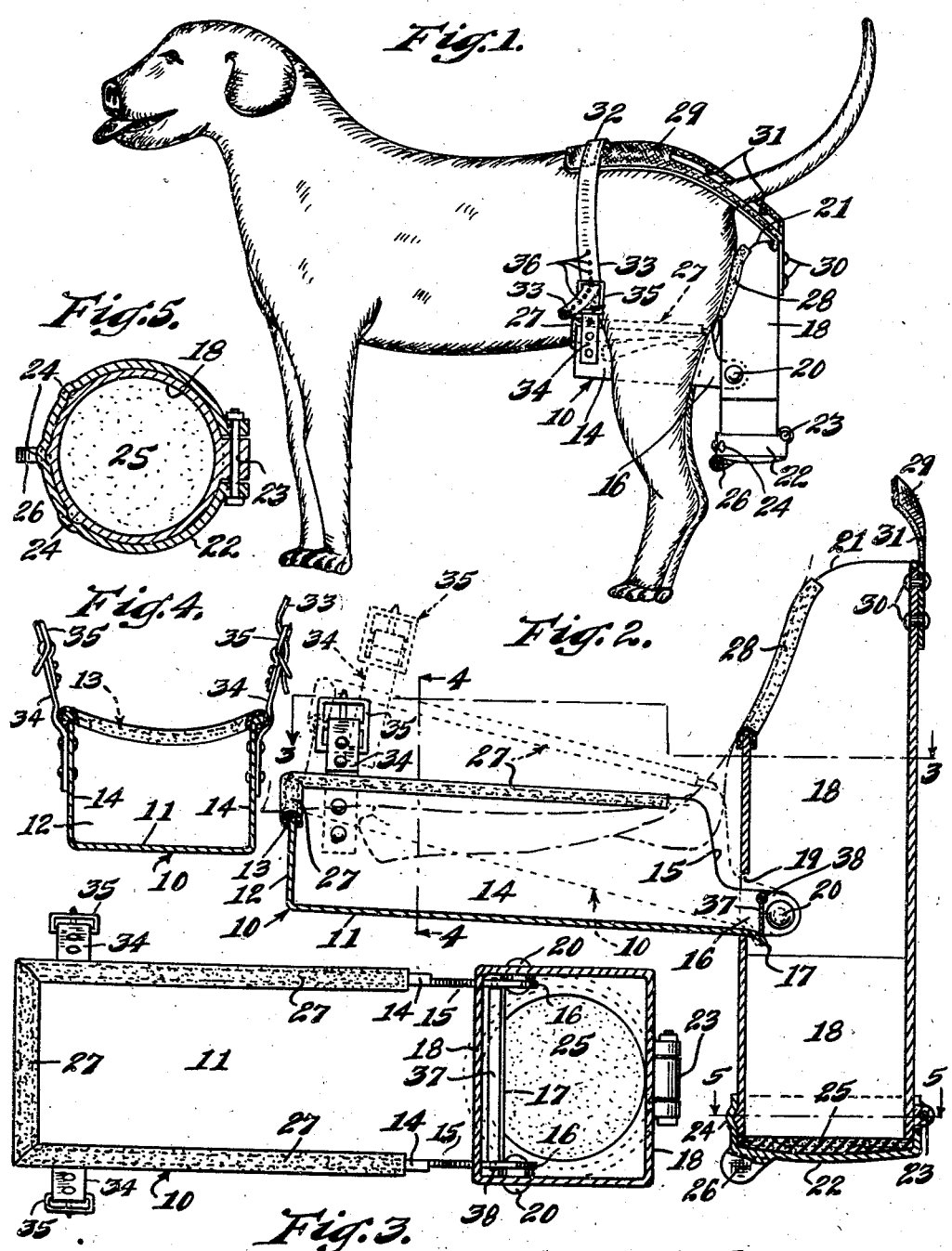

2,173,356

UNITED STATES PATENT OFFICE 2,173,356

SANITARY DEVICE FOR ANIMALS

John Cross, Chicago, Ill.

Application January 3, 1939, Serial No. 248,995

8 Claims. (Cl. 119—95)

This invention relates to a sanitary device for animals and more particularly to a sanitary pan for animals, especially dogs, for receiving excrement and urine to be emptied in a manner to provide means of cleanliness and helpful from a health standpoint, in that the waste matter is prevented from being promiscuously deposited and scattered or blown about to be picked up in walking and carried into the house, besides saving or guarding lawns and flowers in that the device can be easily and conveniently removed and emptied into a waste pipe or secluded spot or pit, and the device sterilized before reuse.

The invention has for its objects to provide a novel and simple device for the above purposes, which is constructed to be readily applied and removed; which is capable of adjustment within a range which will adapt it for growing dogs or until housebroken and thereafter, as well as for different sized animals, and which will give no inconvenience or discomfort to the animal of any appreciable extent.

Other objects and advantages will be apparent from the following description, reference being had to the accompanying drawing, wherein:

Fig. 1 is a side elevation showing the device applied;

Fig. 2 is an enlarged vertical section;

Fig. 3 is a top plan partly in section taken on the section line 3—3 of Fig. 2;

Fig. 4 is a vertical cross-section taken on section line 4—4 of Fig. 2, and

Fig. 5 is a plan section taken on the section line 5—5 of Fig. 2.

Referring more particularly to the drawing, my sanitary device or pan for animals, and especially dogs, is shown as comprising a rearwardly tapered pan or trough 10 made to conform to the shape of the animal's body and open at the top and having a bottom 11, front wall 12 with a concaved beaded top edge 13 to fit the animal, side walls 14 with similar beaded top edges and open at the back and cut away at the top portions of the sides as at 15. The bottom portions of the sides provide extensions or ears 16 apertured as shown and the rear edge of the bottom is downturned to provide a drain apron 17. A vertical rear receptacle 18 of any suitable cross section is provided with a slot 19 to receive the extensions 16 pivoted to the sides of the receptacle as at 20 to swing on a horizontal axis to accommodate movements of the body.

The receptacle 18 is open at the top as at 21 and the edges are tapered and curved to fit the animal at this point. This receptacle 18 extends above and below the trough 10 and the bottom extension may be of any suitable cross section. The lower end thereof is provided with a hinged closure 22 hinged at the back as at 23, although it may be otherwise mounted. It is held closed by snaps 24 holding its flange up around the bottom portion of the vertical receptacle 18 with an interposed rubber gasket or sealing disk 25 to render the same liquid tight and may be manipulated at the front snap side by a lug 26.

The beads 13 and 14 may be covered by a soft rubber or other rolled edge or protective tube or the like 27 to fit the animal and act as a cushion to prevent injury. The top edges of the receptacle 18 are provided with similar cushions or tubes 28 for the same purpose as the cushion 27. In order to conveniently mount the device on the animal to properly conform in comfort and render it adjustable, the top edge of the back of the receptacle 18 is provided with a flexible strip 29 hinged or secured thereto in any suitable manner as at 30 and adapted to extend up forwardly over the back of the animal. The strip is provided with a central longitudinal slot 31 receiving the tail of the animal and accommodating different animals while permitting movement thereof. A cross body strap 32 is mounted on the front end of the strip 29 and the ends depend and fit the sides of the animal's body. The lower ends 33 are adjustably connected to the sides of the trough 10, as by means of straps 34 connected to the side walls 14 and carrying buckles 35 at their upper ends to connect to ends 33 by perforations 36.

The trough 11 and receptacle 18 may be of any suitable material, stiff or flexible, such as rubber, porcelain, hide or metal, and may be enameled or otherwise coated to facilitate sterilizing and cleaning. The extensions or ears 16 may also pivotally mount a trap door 37 on a pivot or pivots 38 at the slot 19 to automatically and normally close when the trough is horizontal in the normal position of the animal and to open rearwardly when the body is inclined, as shown in dotted lines in Fig. 2 as it is thought will be obvious. The receptacle 18 will always remain plumb or vertical to insure deposit of the material therein.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a sanitary device of the class described, a pan, a receptacle pivoted at the back of the pan and into which the same opens, and means on the pan and receptacle to attach the same to an animal.

2. In a sanitary device of the class described, a pan, a receptacle pivoted at the back of the pan and into which the same opens, means at the front portion of the pan to adjustably attach the same to an animal over the back, and means extending rearwardly on the back to connect to the top of the receptacle and support the latter.

3. A device of the character described, comprising a horizontal trough having front and side walls and open at the top, means to conform and cushion the same against the body, a vertical rear receptacle having an opening receiving the trough, a trap door at said opening, a closure for the bottom of the receptacle, and means carried by the trough and receptacle to adjustably attach the same to an animal.

4. A device of the character described, comprising a horizontal trough tapered rearwardly and provided with body conforming means, a vertical receptacle pivoted to the rear end of the trough and communicating therewith, a liquid tight closure for the bottom of the receptacle, a strip at the top of the receptacle having a slot for an animal's tail, and adjustable strap connections between the strip and sides of the trough.

5. In a sanitary device of the class described, a horizontal open top trough, a vertical receptacle hinged at the back of the trough to move in angular relation to the trough and extending above and below the same and means to attach the trough and receptacle to an animal.

6. In a device of the class described, a horizontal receptacle to fit beneath the body of an animal and between the hind legs, a vertical receptacle at the back of the horizontal receptacle and adapted to receive the discharge therefrom, said vertical receptacle having a bottom discharge opening and a closure therefor, a slotted member hinged at the top of the vertical receptacle and adapted to extend over the back of the animal with the tail extending through the slot and straps at the front end of the slotted member and extending down the sides of the animal for connection to the horizontal receptacle.

7. In a device of the class described, a horizontal receptacle to fit beneath the body of an animal and between the hind legs, a vertical receptacle at the back of the horizontal receptacle to extend above and below the same and adapted to receive the discharge therefrom, said vertical receptacle having a bottom discharge opening and a closure therefor, a slotted member hinged at the top of the vertical receptacle and adapted to extend over the back of the animal with the tail extending through the slot and straps at the front end of the slotted member and extending down the sides of the animal for adjustable connection to the horizontal receptacle.

8. A device of the character described comprising a horizontal trough provided with body conforming means, a vertical receptacle receiving the rear end of the trough therein, said receptacle being open at the top, a closure for the bottom of the receptacle, a back support at the top of the receptacle and a strap connection between the support and front portion of the trough.

JOHN CROSS.